Nov. 18, 1941.    A. BERGER    2,263,159

MULTISTAGE EPICYCLIC GEAR

Filed Dec. 8, 1939

Arthur Berger
INVENTOR

BY
his ATTORNEY

Patented Nov. 18, 1941

2,263,159

UNITED STATES PATENT OFFICE 2,263,159

MULTISTAGE EPICYCLIC GEAR

Arthur Berger, Stuttgart-Oberturkheim, Germany, assignor to Daimler-Benz Aktiengesellschaft, Stuttgart-Unterturkheim, Germany Application December 8, 1939, Serial No. 308,231
In Germany October 31, 1938

4 Claims. (Cl. 74—273)

My invention relates to a couplingless multistage epicyclic gear particularly adapted for high speed engines like charging blowers, fans or combustion engines. The object of my invention is to create a gear system which is light in weight and very durable. A further object of my invention is to provide a gear system which occupies a minimum amount of space and is capable of delivering high speeds up to 40,000 R. P. M.

Couplingless multistage epicyclic gears having different speedstages which can be thrown in by braking alternative parts of the gear are known. Such gears are also known in which a speed change of the driven shaft may be obtained by holding or by special driving of the outer gear wheel.

The disadvantages of such constructions are that they are extremely bulky and heavy as a result of the gears being mounted upon different shafts which are eccentric with respect to each other.

According to the present invention these disadvantages are avoided by mounting all parts of the multistage epicyclic gear centrally to the main shaft and therefore completely symmetrically with respect to this shaft. By this measure the centrifugal forces are extraordinarily reduced and the outer dimensions of the gear are very much less than the corresponding dimension of the known constructions. According to my invention all of the rotating parts may be mounted upon the central shaft or the hollow shaft surrounding said shaft so that smaller and lighter bearings may be employed.

The various gear stages may be attained by holding or braking separate gear parts. The brakes may be actuated either by hand or be dependent upon any known automatic actuating means.

Figure 1:
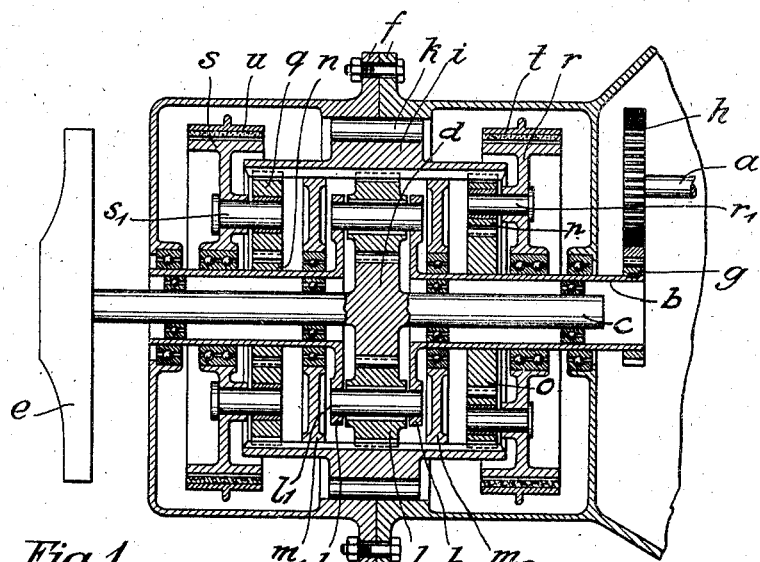

My invention is illustratively exemplified in the accompanying drawing in which:

Fig. 1 a sectional view of the epicyclic gear, and

Figure 2:
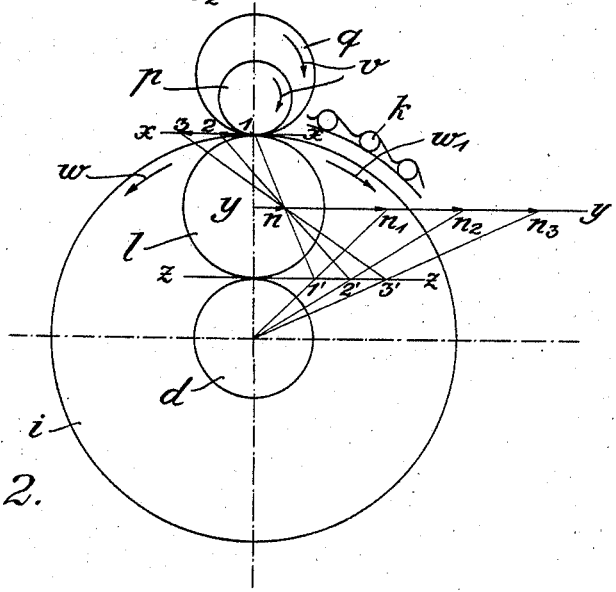

Fig. 2 a diagram of the ratio of the number of revolutions of the epicyclic gear in different gear stages.

The motor shaft $a$ drives by means of the toothed wheels $h$, $g$ the driving shaft $b$ of the epicyclic gear. The multipart shaft $b$ carries the flanges $b_1$ and $b_2$. The planet wheels $l$ are freely rotatable about the shaft $l_1$ and engage at one side of the sun wheel $d$ upon the driven shaft $c$ and at the other side the internal gear of the cylindrical drum $i$. The wheel $e$ of a charging blower is for instance connected to the shaft $c$. The speed change gears $n$ and $o$ are connected with the driving shaft $b$, and engage in their turn intermediate wheels $q$ and $p$, respectively. The shafts $r_1$, $s_1$ of the intermediate wheels $p$, $q$ are supported by wheel carriers $r$, $s$ rotatably mounted upon the driving shaft $b$. The intermediate wheels $p$, $q$ are in mesh with the internal gear of the drum $i$, which is rotatably supported on the driving shaft $b$ by means of the discs $m_1$ and $m_2$.

On the outer periphery of the drum $i$ there is provided a freewheel or ratchet gear mechanism $k$ permitting rotation of the drum $i$ in one direction only. The freewheel mechanism $k$ is supported by the fixed casing $f$. The wheel carriers $r$ and $s$ may be held or released by the brakes $t$ and $u$, respectively. The casing $f$ is constructed in two parts to facilitate assembling.

The diagram shown in Fig. 2 shows the planet wheel $l$, the sun wheel $d$, and the drum $i$ as well as the intermediate wheels $p$ and $q$ which later rotate in the direction of the arrow $v$ for the particular driving of the drum $i$. The freewheel or ratchet mechanism is indicated by $k$. In this figure the speed stages and the numbers of revolutions are represented diagrammatically and indicated by the numbers $1$, $2$, $3$; $1'$, $2'$, $3'$ and $n$, $n_1$, $n_2$, $n_3$.

The gear works in the following manner:

The driving shaft $b$ and with it the planet star rotates with a constant or nearly constant number of revolutions $n$. For obtaining the speed $n_1$ both brakes $t$ and $u$ are released, so that the force of the driving shaft $b$ is transferred from the planet wheels $l$ through the sun wheel $d$ to the driven shaft $c$. The freewheel mechanism $k$ then prevents the drum $i$ from rotating in the direction $w_1$ so that, as appears from Fig. 2, when the planet star rotates with the constant number of revolutions $n$, the driven sun wheel $d$ rotates with a number of revolutions $n_1$. If the speed stage corresponding to the number of revolutions $n_2$ is to be thrown in, the brake $u$ is actuated and the wheel carrier $s$ with the shafts $s'$ is arrested. The number of revolutions transferred from the driving shaft $b$ to the sun wheel $d$ is now influenced by the special driving of the drum $i$ by means of the speed change gear $n$ and intermediate wheel $q$ in the direction $w$. The gear ratio, in this case, is represented diagrammatically in Fig. 2 by the points $2$, $n$, $2'$ and $n_2$. If the stage $3$ is to be thrown in, the brake $u$ is released and the brake $t$ is actuated to arrest the wheel carrier $r$ with the shafts $r_1$. The drum $i$ is then driven by means of the speed change gear $o$ and intermediate wheel $p$, so that the number of revolutions $n_3$ represented by the points 3, $n$, 3' and $n_3$ in Fig. 2 is obtained.

For a further regulation of the number of revolutions, it is possible to arrange a controllable liquid coupling either in the motor shaft $a$ or in the gear shaft $c$, by which the different stages of revolutions $n_1$, $n_2$, $n_3$ are bridged and a stageless control of the number of revolutions is obtained. The shaft $b$ may also be driven directly from the motor shaft without the transmission $g$, $h$ and rotate with the number of revolutions of the motor. The freewheel mechanism shown may be replaced by a ratchet mechanism or by any other suitable uni-directional brake device.

What I claim is:

1. An epicyclic driving gear, comprising a driven shaft, a hollow driving shaft including two axially spaced cylindrical portions rotatably carried by and surrounding said driven shaft, said two driving shaft portions having at their inner ends radial members facing one another, a shaft bolt connecting said radial members and extending parallel to and at a radial distance from said driven shaft, a planet wheel rotatable on said shaft bolt, a sun wheel secured to said driven shaft between the inner ends of the two driving shaft portions and in permanent mesh with said planet wheel, a drum mounted rotatably about said driving shaft and having a diameter substantially equal to that of the outer periphery of the planet wheel path, said drum including a toothed portion in permanent mesh with said planet wheel, means to prevent rotation of said drum in one direction, two speed change gears of different diameter secured to the two driving shaft portions, respectively, an intermediate wheel in mesh with each speed change gear, each intermediate wheel having operatively connected therewith two elements, one of said elements being a wheel carrier mounted for rotation about said driving shaft and including an axially projecting axle on which the intermediate wheel is rotatably supported, the second element being a toothed annulus rotatable about the driving shaft and peripherially meshing with the intermediate wheel, one of said elements connected with each intermediate wheel being rigid with said drum, and independent means to brake the other element of each intermediate wheel.

2. An epicyclic driving gear as claimed in claim 1, including radial elements rotatably mounted on said driving shaft portions between the inner ends thereof and said speed change gears, said radial elements being rigid with said drum and supporting the same on the driving shaft.

3. An epicyclic driving gear, as claimed in claim 1, in which said means to prevent said drum from rotating in one direction includes a free wheel mechanism.

4. An epicyclic driving gear comprising a driven shaft, a hollow driving shaft including two axially spaced cylindrical portions rotatably carried by and surrounding said driven shaft, said two driving shaft portions having at their inner ends radial members facing one another, a shaft bolt connecting said radial members and extending parallel to and at a radial distance from said driven shaft, a planet wheel rotatable on said shaft bolt, a sun wheel secured to said driven shaft between the inner ends of the two driving shaft portions and in permanent mesh with said planet wheel, a drum mounted rotatably about said driving shaft and having a diameter substantially equal to that of the outer periphery of the planet wheel path, said drum including a toothed middle portion in permanent mesh with said planet wheel and two toothed side portions, means to prevent rotation of said drum in one direction, two speed change gears of different diameters secured to the two driving shaft portions, respectively, two wheel carriers rotatably mounted on said two driving shaft portions, respectively, each of said wheel carriers supporting an axially projecting axle, an intermediate wheel rotatably mounted on each of said axles and in permanent mesh with one of said speed change gears and with one of said toothed side portions of said drum, and braking means for each of said wheel carriers.

ARTHUR BERGER.